Oct. 27, 1942.　　　　　A. F. DITTMER　　　　　2,300,210
APPARATUS FOR MAKING CONTACT LENSES
Filed Dec. 31, 1938　　　3 Sheets-Sheet 1
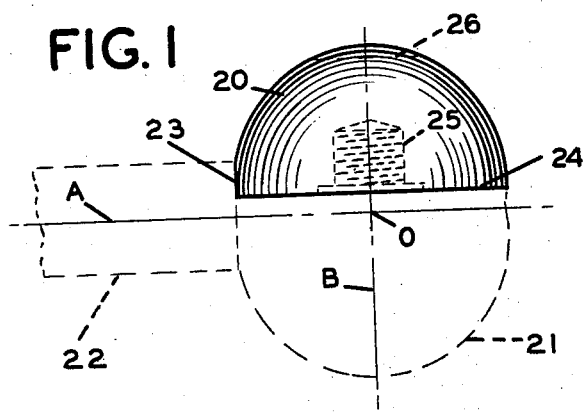
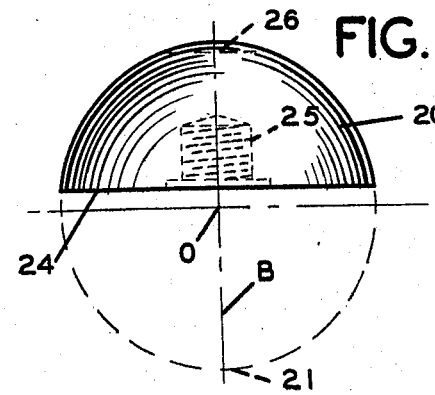
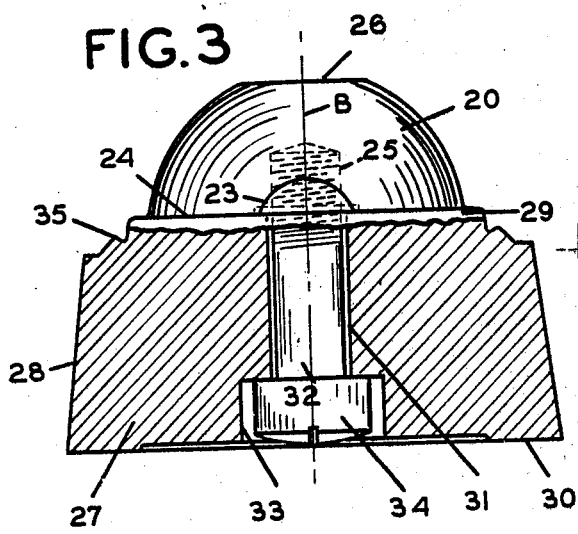
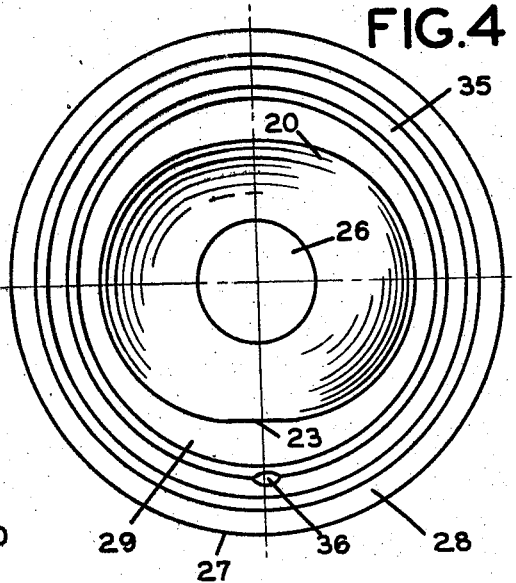
ARTHUR F. DITTMER
INVENTOR
BY
ATTORNEYS

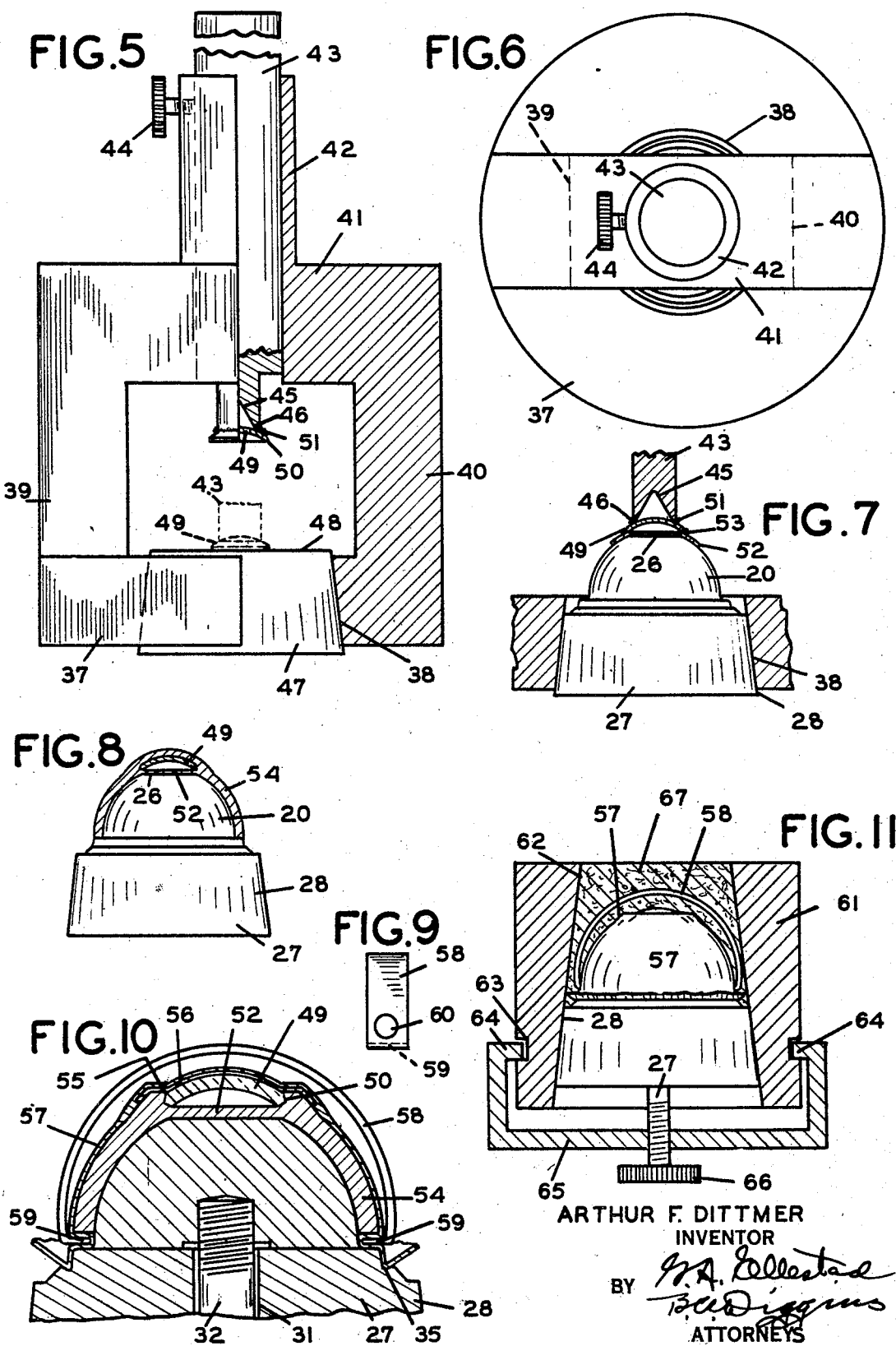

Oct. 27, 1942.    A. F. DITTMER    2,300,210
APPARATUS FOR MAKING CONTACT LENSES
Filed Dec. 31, 1938    3 Sheets-Sheet 3

ARTHUR F. DITTMER
INVENTOR
BY
ATTORNEYS

Patented Oct. 27, 1942

2,300,210

UNITED STATES PATENT OFFICE 2,300,210

APPARATUS FOR MAKING CONTACT LENSES

Arthur F. Dittmer, Rochester, N. Y., assignor to Bausch & Lomb Optical Company, Rochester, N. Y., a corporation of New York Application December 31, 1938, Serial No. 248,832

1 Claim. (Cl. 18—34)

The present invention relates to contact lenses of the type having a glass corneal portion and a molded scleral rim of plastic material, and more particularly to apparatus for making contact lenses of this type. Such lenses are described and claimed in U. S. Patent 2,129,304 issued September 6, 1938, to William Feinbloom for Contact lenses; U. S. Patent 2,129,305 issued September 6, 1938, to William Feinbloom for Contact lenses; U. S. patent application Serial No. 87,577 filed June 26, 1936, by William Feinbloom for Method and means for making contact lenses, and U. S. patent application Serial No. 193,521 filed March 2, 1938, now Patent Number 2,196,066, by William Feinbloom for Contact lens and method of fitting same.

From experiment, it has been found that there are five main factors affecting the fit of a contact lens. These factors are: (1) the radius of curvature of the scleral rim in the horizontal meridian, (2) the radius of curvature of the scleral rim in the vertical meridian, (3) the corneal build up, or the amount the rear surface of the corneal lens is spaced from the contacting surface of the scleral rim, (4) the overall size of the lens, and (5) the position of the corneal lens in the scleral rim. Other factors such as the radius of curvature of the corneal lens, the smallest diameter of the scleral rim adjacent the lens and the shape of the junction between the scleral rim and the corneal lens also affect the fit but the five listed above are the principal factors.

It has been found possible to choose values for the last three of the variables and provide a test set in which only the first two are varied and still fit a large percentage of patients. Various lenses from this set are placed in the patient's eye until a lens is found which is comfortable and does not cause any irritation. The lens then prescribed for the patient is one which is substantially identical with the test lens in all of the factors or quantities which affect the fit.

Optical accuracy is equally as important as accuracy of fit and optical accuracy includes not only close control of the power of the corneal lens but also requires accurate positioning of the corneal lens relative to the contacting surface of the scleral rim.

The present invention relates chiefly to the molding of the scleral rim and the control of the first three variables while the apparatus for finishing the contact lens and controlling the last two variables is described in my copending application Serial No. 248,831, now Patent Number 2,225,040, filed concurrently herewith for Apparatus for finishing contact lenses.

One of the objects of the present invention is to provide a new and improved apparatus for making contact lenses of the type having a glass corneal lens and a molded scleral rim of plastic material. Another object is to provide a suitable mold for forming the scleral rim of such lenses. A further object is to provide apparatus for locating the corneal lens relative to the mold. Still another object is to provide a suitable vulcanizing fixture. These and other objects and advantages reside in certain novel features of construction, arrangement and combination of parts as will hereinafter be more fully set forth and pointed out in the appended claim.

Referring to the drawing:

Fig. 1 is a side elevation of the rim forming portion of the male mold.

Fig. 2 is a front elevation thereof.

Fig. 3 is a vertical section of the complete male mold with parts in elevation.

Fig. 4 is a top plan view of the complete male mold.

Fig. 5 is a side elevation with parts in section of the corneal lens centering apparatus.

Fig. 6 is a top plan view thereof.

Fig. 7 is a fragmentary elevation showing the lens being secured to the male mold.

Fig. 8 is a side elevation of the male mold and lens after waxing.

Fig. 9 is a side elevation of a spring clamp.

Fig. 10 is a vertical section of the male mold and lens just prior to formation of the female mold.

Fig. 11 is a vertical section of the fixture used for casting the female mold.

Figure 12:
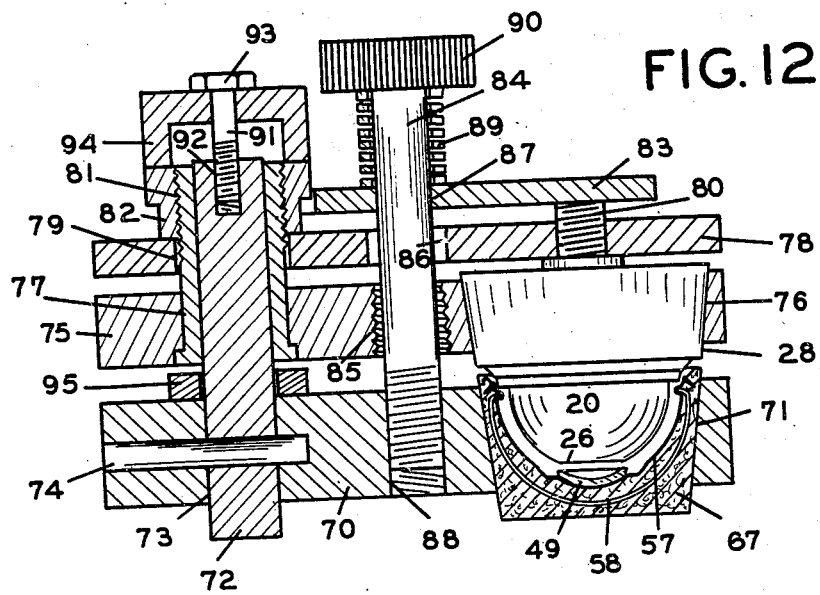
Fig. 12 is a vertical section of the vulcanizing fixture.

One suitable method of producing reproducible contact lens molds is shown in Figs. 1 to 4 wherein 20 designates the rim forming portion of the male mold. 20 is a part of a torus 21 which is suitably turned or cut from suitable material such as metal. The torus 21 is formed on the end of a rod or shaft 22 and, when the torus 21 is complete, the shaft 22 is cut off leaving a small flat area 23 on the side of the torus 21. The portion 20 is cut from the torus 21 along a flat surface 24 parallel to the axis A of the torus and spaced from the center O of the torus. This center O is the point where the axis A intersects the plane of rotation of the center of the generating circle.

A threaded hole 25 is tapped through the surface 24 concentric with the axis B of the portion 20. The top of the portion 20 is then ground or cut off to form a flat surface 26, the purpose of which will be hereafter described.

The locating portion 27 of the male mold has a conical outside surface 28 and its top surface 29 and bottom surface 30 are perpendicular to the axis of the cone forming the surface 28. The portion 27 is provided with a central bore 31 concentric with the conical surface 28 and a screw 32 extending through the bore 31 is threaded into the tapped hole 25 of the rim forming portion 20 and clamps the surface 24 of the portion 20 against the surface 29 of the portion 27. The bore 31 is made larger than the screw 32 so that the axis B of the portion 20 can be brought into exact coincidence with the axis of the conical locating surface 28. The rear surface of the portion 27 is recessed about the bore 31 as indicated at 33 to receive the head 34 of the screw 32.

The two portions 20 and 27 are not only made coaxial but the center O of the torus occupies a fixed predetermined position relative to the size of the cone. In other words, the center O of the torus is located at a predetermined distance from the apex of the cone which forms the locating surface 28. Thus, when the complete mold 20, 27 is placed in a conical hole, the portion 20 is not only centered but occupies a predetermined longitudinal position as well. The bottom surface 30 of the portion 27 is a fixed predetermined distance from the center O of the portion 20.

The top 29 of the portion 27 has projection 35 surounding the portion 20 which serves to form a plastic lock for insuring proper pressure on the plastic during vulcanization. An indexing depression 36 is formed at one point on this projection 35.

After the portions 20 and 27 are assembled, the joint between the portion 20 and the top 29 is covered with solder and the top 20 and surface 29 are plated with a hard metal such as nickel or chromium. The surface of the portion 20 is then polished.

The apparatus for locating the corneal lens on the mold is illustrated in Figs. 5, 6 and 7. This apparatus consists of a relatively thick base plate 37 having a conical aperture 38 extending therethrough. Two uprights 39 and 40 are rigidly secured to the base plate 37 and carry a rigid cross bar 41. A long cylindrical bearing sleeve 42 is fixed to the cross bar 41 above the aperture 38 with its axis coincident with the axis of the aperture 38. A rod 43 is slidably mounted in the sleeve 42 and may be locked in any position by a set screw 44. The lower end of this rod 43 has a central depression or recess 45 leaving a lens engaging annular edge 46.

In order to locate a lens by means of this apparatus, a frusto conical block 47 is located in the aperture 38. The conical locating surface of the block 47 and the conical surface of the aperture 38 are both of substantially the same size and taper as the conical locating surface 28 of the male mold. The top 48 of the block 47 is flat and perpendicular to the axis of the cone.

The glass corneal lens 49 is meniscus in shape and is provided with a bevelled edge 50. This lens 49 is placed on the top 48 of the block 47 and, since the rear surface of the lens is both spherical and circular, the axis of this rear surface is parallel to the axis of the conical locating surfaces of the aperture 38 and block 47. The rod 43 is then lowered against the lens and the circular edge 46 engaging the curved upper surface of the lens 49, moves the lens so that its axis coincides with the axis of the rod 43. The lens 49 is then secured to the rod 43 by some suitable means such as wax 51 and the rod 43 raised to the position shown in Fig. 5 and secured in position by the set screw 44.

The block 47 is then removed and the male mold is inserted in the aperture 38 of the plate 37. In order to obtain the proper corneal build up, the third of the variables listed above, a sheet of wax 52 of the thicknes desired for the build up, is placed on top of the rim forming portion 20 of the male mold. The flat surface 26 of this rim forming portion is smaller than the rear surface of the lens 49 so that the build up provided by the wax 52 extends between the lens 49 and the toric surface of the portion 20. The flat surface 26 merely provides an additional thickness of plastic behind the lens 49 to act as a centering guide in the finishing process described in my copending application Serial No. 248,831, filed concurrently herewith for Apparatus for finishing contact lenses.

The lens 49 is then lowered onto the wax 52 and secured thereto by a ring of wax 53. The relation of the axis of the rod 43 to that of the aperture 38 and the relation of the axis of the mold portion 20 to that of the locating surface 28, thus insures that the lens 49 will be accurately centered on the portion 20. In the event that a small amount of prism is present in the lens 49 due, for example, to faulty manufacture, compensation can be made by decentering the edge 46 of the rod 43 relative to the axis of the sleeve 42. The lens 49 is then secured to the wax 52 by wax 53 and the wax ring 51 is cut away thus releasing the lens 49 from the rod 43.

The portion 20 of the male mold carrying the lens 49 is then dipped into molten wax until, as shown in Fig. 8, a coating 54 is formed of a thickness greater than that desired for the finished scleral rim. This coating 54 is cut away over the convex surface of the lens 49 as indicated at 55 and a thin annular piece of foil 56 is placed over the joint between the lens 49 and wax 54. The exposed surface of the lens 49 is then covered with cement and a layer of foil 57 is placed over the entire mold, wax and lens and burnished down. A spring clamp 58 having inturned edges 59 is placed over the foil 57 and the edges 59 are forced into the wax 54 near the bottom 24 of the mold portion 20. Two aligned holes 60 are formed in the clamp 58 to receive rods, not shown, for opening the clamp 58 prior to its application over the foil 57. The complete positive is now ready, as shown in Fig. 10, for the casting of the negative mold.

The form in which the negative mold is cast consists of a cylinder 61 having a central conical bore 62. The taper of this bore is the same as the taper of the conical locating surface 28 of the male mold. The outside surface of the cylinder 61 has a groove 63 for receiving the inturned edges 64 of a bridge 65 which extends over the large end of the bore 62. A screw 66 is threaded through the bridge 65 and bears against the rear surface of the male mold forcing it into the conical bore 62 as shown in Fig. 11. When the male mold has been pressed into the bore 62 as far as it will go, the small end of the bore 62 is filled with a suitable plaster such as dental stone 67 and the stone is allowed to set forming an exact replica of the bore 62 and the waxed and foiled positive.

After the stone 67 has hardened, the wax 52 and 54 is boiled out. Due to the spring 58 embedded in the stone 67, the foil 57 and lens 49 cemented thereto, remain in the stone negative 67.

The molds and lens are now ready for the making of the scleral rim of the contact lens. As is known, a large variety of materials can be used to form the scleral rim of the contact lens but I prefer a thermosetting resin of the phenol formaldehyde type. Two excellent resins for this purpose are the resins made by the Bakelite Corporation under the identification numbers XR–10247 and XR–11328. Of course, the apparatus herein described can be used with thermoplastic as well as thermosetting resins, and resins other than the phenol formaldehyde resins, but for purposes of illustration, the apparatus and technique will be described with reference to the resins specifically mentioned above.

Figure 13:
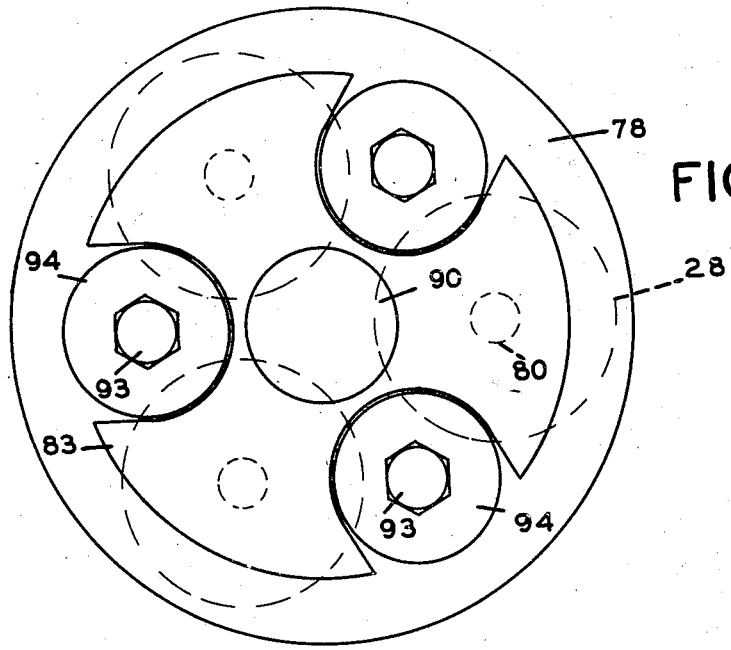
Fig. 13 is a top plan view thereof.

In making the scleral rim, the negative mold 67 carrying the foil 57 and lens 49 is heated and packed with melted plastic. Great care must be exercised in packing the plastic around the bevel 50 of the lens 49 to avoid either displacing the lens or introducing bubbles into the plastic, since either of these faults will spoil the final contact lens. As soon as the negative mold is filled with a suitable amount of melted plastic, the plastic is shaped and vulcanized in the fixture illustrated in Figs. 12 and 13.

This vulcanizing or polymerizing fixture is made to form three contact lenses simultaneously and consists of a heavy, rigid base plate 70 having three conical holes 71 spaced 120 degrees apart. These holes 71 are of the same size and taper as the outside surface of the negative mold 67. Three upright rods 72 are secured in apertures 73 in the base plate 70 by pins 74. These rods 72 are also spaced apart by 120 degrees and the axes of the rods 72 are parallel to each other and to the axes of the conical holes 71.

A positioning plate 75 is formed with three conical holes 76 spaced 120 degrees apart and having the same size and taper as the locating surface 28 of the male mold. Three bearing sleeves 77 are suitably secured in the positioning plate 75 with their axes parallel to the axes of the three holes 76. These bearing sleeves slidably receive the three rods 72 from the base plate 70.

The indentation 36 of the male mold is, of course, transferred to the female mold 67 in the casting of the female mold, as shown in Fig. 11. These two cooperating indexes simplify and insure proper positioning of the two molds relative to each other whenever they may become separated.

A pressure plate 78 is formed with three apertures 79 in alignment, one with each sleeve 77, and with three studs 80, one in alignment with the axis of each hole 76. The top of each sleeve 77 is threaded at 81 to receive a nut 82 which engages the pressure plate 78 and forces it toward the positioning plate 75. The male molds are thus securely locked in the holes 76.

In order to close the molds under pressure, a plate 83 is placed on top of the three studs 80 and a large screw 84 is inserted through the holes 85, 86 and 87 in the plates 75, 78 and 83, respectively, and threaded into a tapped hole 88 in the base plate 70. A heavy spring 89 transmits the pressure from the enlarged head 90 of the screw 84 to the plate 83.

The pressure between the molds can be maintained by screws 91 which are threaded into holes 92 in the tops of the rods 72. The enlarged heads 93 of the screws 91 rest on caps 94 which in turn rest on the nuts 82. These screws 91 press the molds together by taking up the lost motion between the nuts 82 and threads 81 of the sleeve 77. Once the screws 91 have been tightened to secure the molds together, the screw 84, spring 89 and plate 83 can be removed.

In order to secure proper closing without undue pressure on the molds, a spacing ring 95 is located on each rod 72 between the base plate 70 and the positioning plate 75. These rings 95 insure an equal and even pressure each time the molds are closed.

The plastic lock ring 35 and its complement formed in the negative in the casting step shown in Fig. 11, regulate and retard the egress of plastic form between the molds and thus cause a high pressure in the plastic when the molds are closed. The molds and plastic are then raised to the temperature recommended for the particular plastic and baked for the proper length of time. In the case of a resin such as the Bakelite Corporation resin XR–11328 baking for about one-half hour at 260 to 270 degrees F. is adequate.

Figure 14:
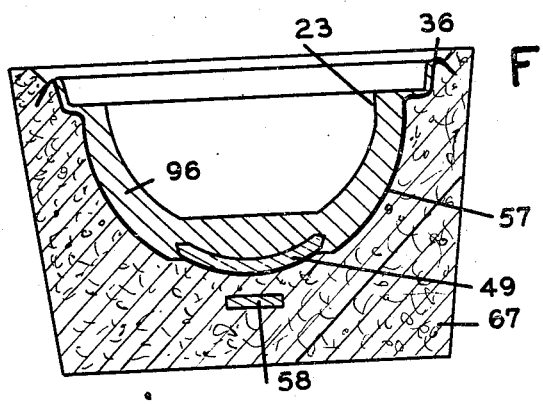
Fig. 14 is a vertical section of the molded contact lens blank.

The hole 85 in the positioning plate 75 is larger than the hole 88 in the base plate 70. This hole 85 is threaded to receive a screw, not shown, and when the screw is inserted, it bears against the base plate 70 and forces the two molds apart. The lens 49 and plastic 96 remain in the negative mold 67 as shown in Fig. 14, and the contact lens is ready for finishing as described in my copending application hereinbefore referred to.

From the foregoing it will be apparent that I am able to attain the objects of my invention and provide a new and improved apparatus for making contact lenses of the type having a glass corneal lens and a molded scleral rim of plastic material. Various modifications can, of course, be made without departing from the spirit of my invention or the scope of the appended claim.

I claim:

A form for making a negative mold for the manufacture of contact lenses of the type having a glass corneal lens and a scleral rim of moldable plastic material, comprising a frusto-conical locating member, a rim forming member secured on the small end thereof with its center on the axis of the frusto-conical member and in predetermined position relative to the size and taper thereof, a sleeve having a conical opening therethrough, the taper of the opening being the same as the taper of the locating member, and means for pressing said locating member into the large end of the opening in said sleeve, the sides of said opening and said locating member and rim forming member constituting a form in which said mold can be cast.

ARTHUR F. DITTMER.